March 16, 1954 E. B. PATTERSON 2,672,422
METHOD OF MAKING PREPREPARED DESSERT
Filed March 17, 1952
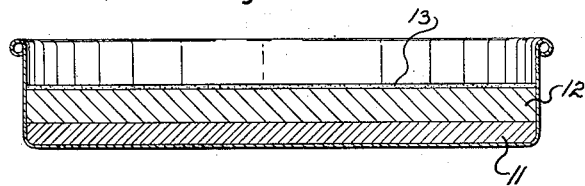
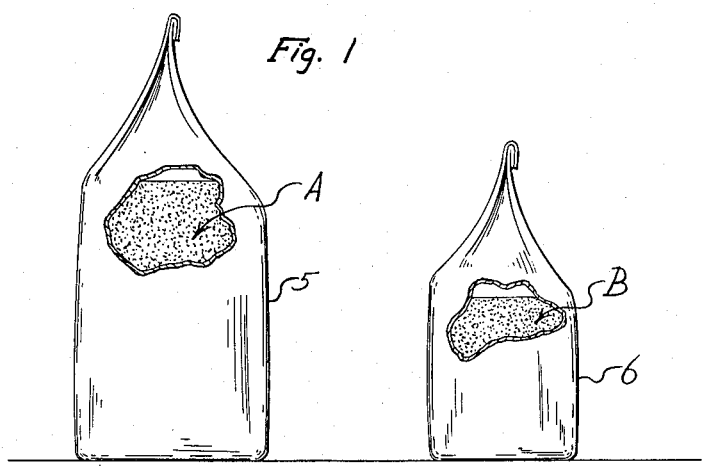
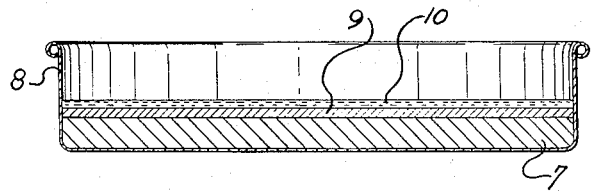
INVENTOR
ESTHER B PATTERSON
BY Williamson & Williamson
ATTORNEYS Patented Mar. 16, 1954

2,672,422

UNITED STATES PATENT OFFICE 2,672,422

METHOD OF MAKING PREPREPARED DESSERT

Esther B. Patterson, Minneapolis, Minn.

Application March 17, 1952, Serial No. 277,039

8 Claims. (Cl. 99—139)

This invention relates to the preparation of foods for human consumption. More particularly, it relates to methods and prepared compositions for producing a class of food commonly referred to as desserts.

It is a general object of my invention to provide a novel and improved dessert capable of being made easily, cheaply and simply.

A more specific object is to provide a novel and improved dessert, the dry components of which may be prepared, packaged and sold and to provide a novel method for converting these ingredients into such a dessert.

Another object is to provide a novel dessert having a pudding type base, a cake-like covering over that base and a thin crispy crust atop the covering.

Another object is to provide a novel and unique method for preparing a dessert of the class described above.

These and other objects and advantages of my invention will more fully appear from the following description made in connection with the accompanying drawings, wherein like reference characters refer to similar parts throughout the several views, and in which:

Fig. 1 is an end elevational view of the two packaged containers which are sold together and which contain the ingredients utilized in preparing the dessert;

Fig. 2 is a vertical sectional view of a baking container containing a dessert made in accordance with my invention; and Fig. 3 is a vertical sectional view of a baking container showing the materials from which the dessert is made after they have been prepared and deposited within the container in the proper manner prior to baking.

One embodiment of my invention may include, as illustrated in Figs. 1–3, two dry pulverulent mixtures which, for the sake of convenience, have been indicated as mixture A and mixture B. As shown in Fig. 1, these mixtures may be pre-prepared in their dry form, mixture A being packaged in a relatively large bag 5 and mixture B being packaged in a smaller and similar bag 6. The two bags 5 and 6 and their mixtures A and B are sold in a single packaged unit with the necessary instructions for preparing the dessert in its final form in the manner to be hereinafter described.

To prepare mixture A, I preferably mix by volume approximately 16 parts of wheat flour, 12 parts of sugar, 3 parts of vegetable shortening and 1 part leavening agent such as baking powder. To this mixture I add approximately ⅛ part salt and if I desire the pudding to have a cocoa flavor, 2 parts cocoa. This material is well mixed and packaged in the package 5. If desired, for flavor I sometimes add ½ part vanilla.

Mixture B I prepare by mixing together by volume about 8 parts white granulated sugar, 8 parts brown sugar, 2 parts powdered skim milk, a dash of salt and if I desire the dessert to have a cocoa flavoring, 2 parts cocoa. These ingredients are mixed well in their dried state and packaged in the container 6.

In the preparation of the dessert, the contents of the container 5, which is mixture A, is mixed thoroughly with about 8 parts of liquid whole milk and stirred until the same becomes a relatively thick batter 7 which is placed in a baking container 8, as shown in Fig. 3. I then proceed to sprinkle the contents of package 6, which is mixture B, evenly over the top of the batter 7 to form a layer 9. I next pour 32 parts of cold water, fruit juice, or other suitable liquid 10 over the top of the layer 9 and the batter 7 and then bake the entire contents of the baking container 8 at a temperature of about 375 degrees Fahrenheit for a period of about forty minutes.

The resulting dessert is shown in vertical section in Fig. 2. It consists of a pudding like base or custard 11 with a cake-like covering 12, this cake-like covering having a thin crispy crust 13 across its upper surface. The relative thickness of the respective layers of material 11, 12 and 13 are best shown in Fig. 2. This crust 13 may be slightly sugary if the mixture is baked at once.

I am not positive of exactly what action takes place during the baking of this material to form this new dessert. I believe that at least some of the water absorbs at least some of the material of mixture B and that it passes downwardly during the baking process through the layer of batter 7. I believe that during its passage through the batter 7 it picks up certain ingredients of the batter, probably some of the flour, to provide the necessary ingredients to form a thick and pleasing pudding layer base beneath the cake-like covering 12. The covering 12 has a texture highly resembling that of a cake and the layer 13 is thin and crispy and may be somewhat sugary. I am currently conducting additional tests to determine exactly what chemical action takes place which will produce this novel dessert. I have found that it is very flavorable and enjoyable to eat and can be produced with a minimum of time and effort.

The most important advantage of my invention, of course, is the fact that it provides a novel and delectable dessert, the dry components of which may be pre-prepared and packaged so that the dessert may be prepared whenever desired with a minimum of time and delay. No cooking skill whatsoever is required to prepare this pleasing dessert and there is no possibility of the dessert not being produced as described if the simple instructions as outlined above are followed.

If I desire to obtain a pudding beneath the cake-like covering 12 having a vanilla flavoring, this may be accomplished by substituting white sugar for brown sugar in mixture B and by eliminating the cocoa from both of the mixtures. If a caramel flavoring is desired, the cocoa is withheld from both mixtures A and B and brown sugar is substituted in both mixtures for the white sugar. If an orange flavored dessert is required, I leave out the cocoa in both mixtures A and B and substitute white for brown sugar in mixture B, adding powdered orange thereto in desired quantities. In each instance, however, it appears that as the batter raises during the baking process because of the presence of the leavening agent, the water which has dissolved at least a part of the mixture B seeps through the batter and collects beneath the same, forming a pudding like material therebelow. In these instances as well as when the cocoa is utilized, it is believed that the water passing through the raising batter picks up enough of the flour ingredient from the batter to provide the necessary thickening which results in the formation of the pudding like material 11.

Thus it can be seen that I have provided a novel and unique method for preparing a dessert of the type having a pudding base and a cake-like covering thereover. At the same time I have provided a novel composition of dry ingredients for the production of such a dessert which may be pre-prepared in dry pulverulent form and packaged for ready sale and/or storage. Thus the necessary ingredients for the dessert may be kept readily available and utilized in a very brief period to provide an appetizing and pleasing dessert.

It will, of course, be understood that various changes may be made in the form, details, arrangement and proportions of the various parts without departing from the scope of my invention.

What is claimed is:

1. The method of preparing a dessert having a pudding base, a cake-like covering over the pudding base, and a thin crispy crust atop the covering, said method consisting in adding liquid milk to a dry pulverulent mixture containing wheat flour, shortening, and a leavening agent; mixing said milk with said mixture and forming a batter therefrom; placing said batter into a baking container; then spreading a dry pulverulent mixture of sugar and dried milk over the top of said batter; then covering said batter and said last mentioned mixture with a layer of water; and thereafter baking the entire contents of the container until at least some of said water has dissolved at least some of said second mentioned mixture and descended through said batter to form a pudding base and said batter has been converted into a cake-like covering thereover.

2. The method of preparing a dessert having a pudding base, a cake-like covering over the pudding base, and a thin sugary crust atop the covering, said method consisting in adding liquid milk to a dry pulverulent material containing wheat flour, shortening, a leavening agent, and sugar; mixing said milk with said mixture and forming a batter therefrom; placing said batter into a baking container; then spreading a dry pulverulent mixture of sugar and dried milk over the top of said batter; then covering said batter and said last mentioned mixture with a layer of water and thereafter baking the entire contents of the container until such water has dissolved at least some of said second mentioned mixture to form a pudding base and until said batter has been converted into a cake-like covering thereover.

3. The method of preparing a dessert having a pudding base, a cake-like covering over the pudding base, and a thin sugary crust atop the covering, said method consisting in adding liquid milk to a dry pulverulent mixture containing by volume approximately 16 parts of wheat flour, 12 parts of sugar, 1 part leavening agent, and 3 parts shortening; mixing said milk with said mixture and forming a batter therefrom; placing said batter into a baking container; then spreading a dry pulverulent mixture by volume of about 16 parts sugar and 2 parts dried milk over the top of said batter; then covering said batter and said last mentioned mixture with about 32 parts of water; and thereafter baking the entire contents of the container until at least some of said water has dissolved at least some of said second mentioned mixture and descended through said batter to form a pudding base and until said batter has been converted into a cake-like covering thereover.

4. The method of preparing a dessert having a pudding base, a cake-like covering over the pudding base, and a thin sugary crust atop the covering, said mixture consisting in adding by volume 8 parts liquid milk to a dry pulverulent mixture containing by volume about 16 parts wheat flour, 3 parts shortening, and 1 part leavening agent, mixing said milk with said mixture and forming a batter therefrom; placing said batter into a baking container; then spreading a dry pulverulent mixture by volume of about 16 parts of sugar and 2 parts dried milk over the top of said batter; then covering said batter and said last mentioned mixture with about 32 parts water; and thereafter baking the entire contents of the container at a temperature of about 375 degrees Fahrenheit for about forty minutes until said water has dissolved at least some of said second mentioned mixture and descended through said batter to form a pudding base and until said batter has been converted into a cake-like covering thereover.

5. The method of preparing a dessert which consists in forming a batter of a mixture by volume of approximately 16 parts of wheat flour, 12 parts of white granulated sugar, 1 part of a leavening agent, 3 parts vegetable shortening, 8 parts liquid milk, and one-eighth part salt; placing said batter into a baking container; then spreading a mixture of approximately 8 parts white sugar, 8 parts brown sugar, 2 parts powdered skim milk, and a dash of salt over the top of said batter, then pouring into the container 32 parts of water over the top of said batter and said second mentioned mixture; and thereafter baking the entire contents of the container at a temperature of approximately 375 degrees Fahrenheit for approximately forty minutes.

6. The method of preparing a dessert having a pudding base, a cake-like covering over the pudding base, and a thin sugary crust atop the covering, said method consisting in adding liquid milk to a dry pulverulent mixture containing wheat flour, shortening, and a leavening agent; mixing said milk with said mixture and forming a batter therefrom; placing said batter into a baking container; spreading a dry pulverulent mixture of sugar and dried milk over the top of said batter; covering said batter with a layer of water; and thereafter baking the entire contents of the container until at least some of said water has dissolved at least some of said second mentioned mixture and descended through said batter to form a pudding base and until said batter has been converted into a cake-like covering thereover.

7. The method of preparing a dessert having a pudding base, a cake-like covering over the pudding base, and a thin crispy crust atop the covering, said method consisting in adding liquid milk to a dry pulverulent mixture containing wheat flour, shortening, and a leavening agent; mixing said milk with said mixture and forming a batter therefrom; placing said batter into a baking container; spreading a dry pulverulent mixture of sugar and dried milk over the top of said batter; covering said batter with a layer of water; and thereafter baking the entire contents of the container until at least some of said water has dissolved at least some of said second mentioned mixture and descended through said batter to form a pudding base and said batter has been converted into a cake-like covering thereover.

8. The method of preparing a dessert having a pudding base, a cake-like covering over the pudding base, and a thin crispy crust atop the covering, said method consisting in adding liquid milk to a dry pulverulent mixture containing wheat flour, shortening, and a leavening agent; mixing said milk with said mixture and forming a batter therefrom; placing said batter into a baking container; spreading a dry pulverulent mixture of sugar and dried milk over the top of said batter; covering said batter with a layer of fruit juice; and thereafter baking the entire contents of the container until at least some of said fruit juice has dissolved at least some of said second mentioned mixture and descended through said batter to form a pudding base and said batter has been converted into a cake-like covering thereover.

ESTHER B. PATTERSON.

References Cited in the file of this patent

UNITED STATES PATENTS

| Number | Name | Date |
|---|---|---|
| 1,954,639 | Lorenz | Apr. 10, 1934 |
| 2,509,035 | Corbett | May 23, 1950 |
| 2,525,599 | Gustavson | Oct. 10, 1950 |

OTHER REFERENCES

"Everybody's Cookbook" by Lord; Harcourt, Brace & Company, New York, Revised Edition, pages 232, 233, 237, 238, 255, 438, 439, 605 and 607.